(12) United States Patent
Walker et al.

(10) Patent No.: US 11,261,680 B2
(45) Date of Patent: Mar. 1, 2022

(54) VIBRATORY SCREENING PANEL

(71) Applicant: Halliburton Energy Services, Inc., Houston, TX (US)

(72) Inventors: Piper S. Walker, Houston, TX (US); Jay C. Jenkins, Friendswood, TX (US); Kevin E. Redfern, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 819 days.

(21) Appl. No.: 16/078,355

(22) PCT Filed: Apr. 4, 2016

(86) PCT No.: PCT/US2016/025906
§ 371 (c)(1),
(2) Date: Aug. 21, 2018

(87) PCT Pub. No.: WO2017/176245
PCT Pub. Date: Oct. 12, 2017

(65) Prior Publication Data
US 2021/0140251 A1 May 13, 2021

(51) Int. Cl.
*E21B 21/06* (2006.01)
*B01D 33/03* (2006.01)
*B07B 1/46* (2006.01)

(52) U.S. Cl.
CPC ........ *E21B 21/065* (2013.01); *B01D 33/0384* (2013.01); *B07B 1/4654* (2013.01); *B07B 2230/01* (2013.01)

(58) Field of Classification Search
CPC .............. B01D 33/0384; B07B 1/4654; B07B 2230/01

USPC ......................................................... 210/388
See application file for complete search history.

(56) References Cited

U.S. PATENT DOCUMENTS

| | | | |
|---|---|---|---|
| 6,053,331 A | 4/2000 | Cravello | |
| 6,669,027 B1 | 12/2003 | Mooney et al. | |
| 7,228,971 B2 | 6/2007 | Mooney et al. | |
| 8,020,705 B2 | 9/2011 | Hukki et al. | |
| 2002/0000399 A1* | 1/2002 | Winkler | B07B 1/46 209/399 |
| 2002/0139724 A1 | 10/2002 | Schulte, Jr. et al. | |
| 2004/0007508 A1* | 1/2004 | Schulte, Jr. | B01D 29/012 209/403 |
| 2004/0099578 A1 | 5/2004 | Winkler et al. | |

(Continued)

OTHER PUBLICATIONS

International Search Report and The Written Opinion of the International Search Authority, or the Declaration, dated Jan. 2, 2017, PCT/US2016/025906, 12 pages, ISA/KR.

*Primary Examiner* — Terrell H Matthews
(74) *Attorney, Agent, or Firm* — Haynes and Boone, LLP

(57) ABSTRACT

A removable screen panel assembly for a vibratory screening machine for separating liquids and solids. The screen panel assembly includes a plate, a corrugated screen assembly supported by the plate, hook assemblies connected to opposite ends of the plate, and gaskets connected to the hook assemblies. A first hook assembly has a first end connected to a first end of the plate, a middle portion spaced above first apertures at the first end of the plate, and a second end parallel to the plate. The second end of the first hook assembly and the first end of the plate sandwich a first end of the corrugated screen assembly.

20 Claims, 9 Drawing Sheets

(56) References Cited

U.S. PATENT DOCUMENTS

2014/0262975 A1 9/2014 McGrath
2017/0282216 A1* 10/2017 Timmerman ............. B07B 1/46

* cited by examiner

VIBRATORY SCREENING PANEL

TECHNICAL FIELD

The present disclosure relates generally to vibratory screening machines used to filter solids from liquids. More particularly, the disclosure relates to screen panel assemblies in vibratory screening machines used in the oil and gas industry.

BACKGROUND

In drilling oil and gas wells, drilling fluids are used to lubricate and cool the drill bit and convey drilled cuttings or solids away from the bore hole. These fluids, also called muds, are a mixture of various chemicals in a water- or oil-based solution and can be expensive to make. For both environmental reasons and to reduce the cost of drilling operations, drilling fluid losses are minimized by stripping them away from the drilled cuttings before the cuttings are disposed of. This is done using various specialized machines and tanks.

Vibratory screening machines or shale shakers are the primary tools used to separate the solids from the liquids. After returning to the surface of the well, the used drilling fluid flows directly to the shale shakers where it begins to be processed. Once processed by the shale shakers the drilling fluid is deposited into the mud tanks where other solid control equipment begins to remove the finer solids from it. The solids removed by the shale shaker are discharged out of the discharge port into a separate holding tank where they await further treatment or disposal. Shale shakers are the most important machines in the solid control system as the performance of the successive equipment directly relates to the cleanliness of the treated drilling fluids.

Screens used in the shale shakers filter the solids from the liquids. They must be replaced periodically when they wear down or become clogged with solids. Installation and removal of the screens is usually done by hand and interrupts filtering operations.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
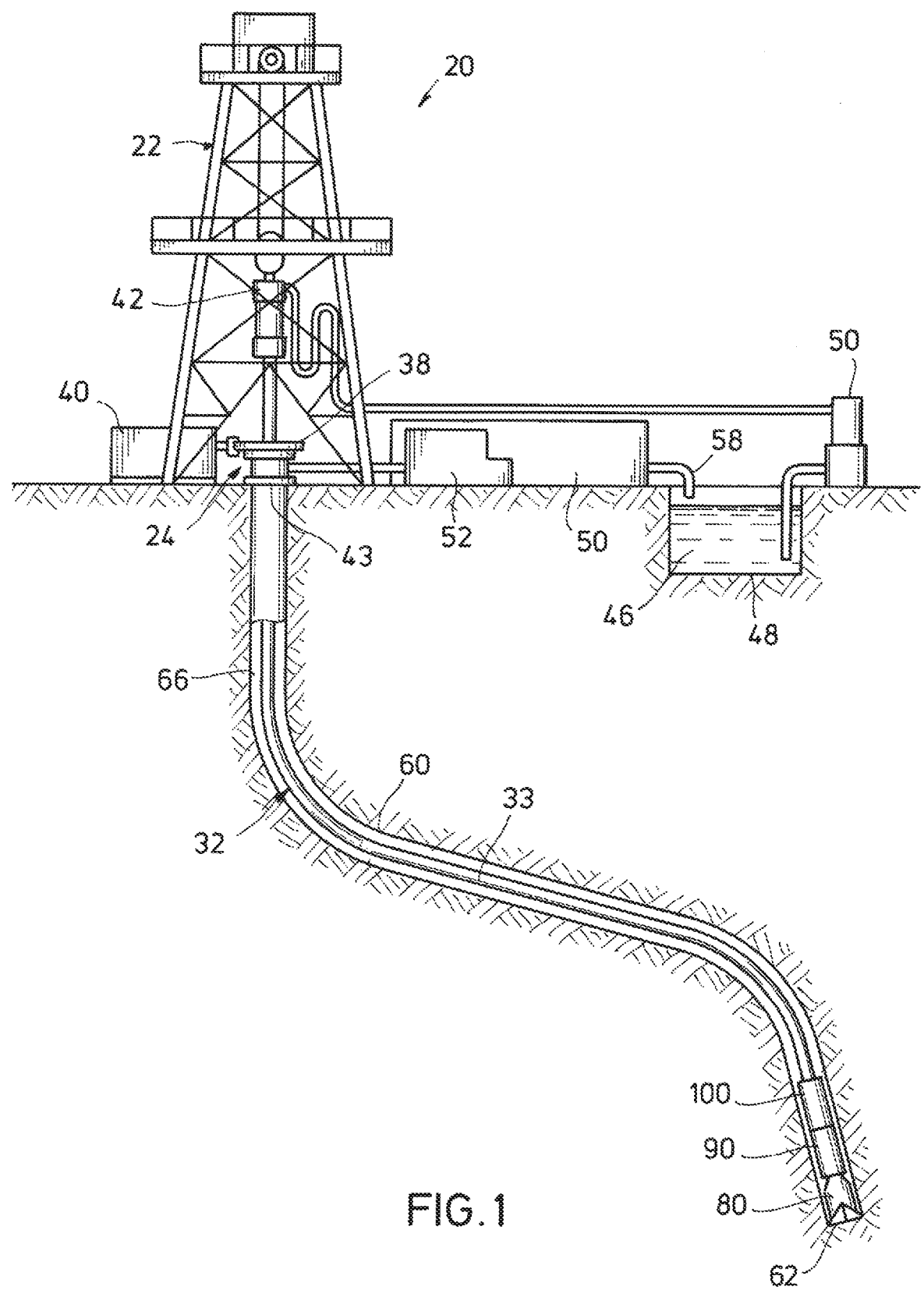
FIG. 1 is a schematic view, partly in cross-section, of an on-shore drilling apparatus including a vibratory screening machine of the present disclosure.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict, for example, a horizontal drilling operation, unless otherwise indicated otherwise, it should be understood by those skilled in the art that the apparatus according to the present disclosure is equally well suited for use in vertical drilling operation. Furthermore, unless otherwise noted, even though a Figure may depict a drilling operation producing a slurry of liquids and solids, it should be understood by those skilled in the art that the apparatus according to the present disclosure is equally well suited for other operations producing compositions of only different dimensions of solids.

Generally, in one or more embodiments, a screen panel assembly is provided. The screen panel assembly is used in a vibratory screening machine to separate liquids and solids. The screen panel assembly is robust and capable of being easily replaced in the machine.

FIG. 1 is an elevation view in partial cross-section of an on-shore drilling system 20 to develop a crude oil and well-gas source. The drilling system 20 recovers oil and gas from a wellbore 60 extending through various earth strata in an oil and gas formation located below the earth's surface. Drilling system 20 may include a drilling rig 22, such as the land drilling rig shown in FIG. 1. However, drilling system 20 may be deployed on offshore platforms, semi-submersibles, drill ships, and the like.

Drilling rig 22 may be located proximate to or spaced apart from wellhead 24, such as in the case of an offshore arrangement. Drilling rig 22 may include rotary table 38, rotary drive motor 40, and other equipment associated with rotation and translation of drill string 32 within wellbore 60. Annulus 66 is formed between the exterior of drill string 32 and the inside wall of wellbore 60. For some applications, drilling rig 22 may also include a top drive unit 42. Pressure control devices 43, such as blowout preventers and other equipment associated with drilling a wellbore may also be provided at wellhead 24.

The lower end of drill string 32 may include bottom hole assembly 90, which may carry at a distal end a rotary drill bit 80. Drilling fluid or "mud" 46 may be pumped from a fluid reservoir 48 by a mud pump 50 to the upper end of drill string 32 and flow through the longitudinal interior 33 of drill string 32, through bottom hole assembly 90, and exit from nozzles formed in rotary drill bit 80. At bottom end 62 of wellbore 60, drilling fluid 46 may mix with formation cuttings and other downhole fluids and debris. The drilling fluid mixture may then flow upwardly through annulus 66 to return formation cuttings and other downhole debris to the surface.

The drilling fluid mixture or slurry flows to a slurry treatment system 50 including a shale shaker 52 having screens to be described below. The shale shaker separates the solids from the liquid. The liquid may be further treated in the slurry treatment system to separate water, oil, and non-gas liquid hydrocarbons. The output of the slurry treatment system, i.e., drilling fluid, flows through pipe 58 into reservoir 48.

Bottom hole assembly 90 may include a downhole mud motor. Bottom hole assembly 90 and/or drill string 32 may also include various other tools that provide information about wellbore 13, such as logging or measurement data from the bottom 62 of wellbore 60. Measurement data and other information may be communicated using electrical signals or other telemetry that can be converted to electrical signals at the well surface to, among other things, monitor the performance of drilling string 32, bottom hole assembly 90, and associated rotary drill bit 80.

In particular, devices, including MWD, LWD instruments, detectors, circuits, or other tools may be provided within a sub 100, according to one or more embodiments described in greater detail below. Sub 100 may be located as part of bottom hole assembly 90 or elsewhere along drill string 32. Moreover, multiple subs 100 may be provided. Although described in conjunction with drilling system 20, sub 100 may be used in any appropriate system and carried along any type of string. Sub 100 may be used to house an instrument, tool, detector, circuitry, or any other suitable device.

In some embodiments, and with continuing reference to FIG. 1, sub 100 includes measuring instrument(s) (not shown) for measuring slurry values such as fluid flow rate, debris flow rate, fluid/debris composition and the like in real time. Optionally, sub 100 may communicate the fluid/solid values as part of a system for optimally screening the slurry whereby the system automatically determines optimal screening values, vibration values, and the like for a vibratory screening machine.

Figure 2:
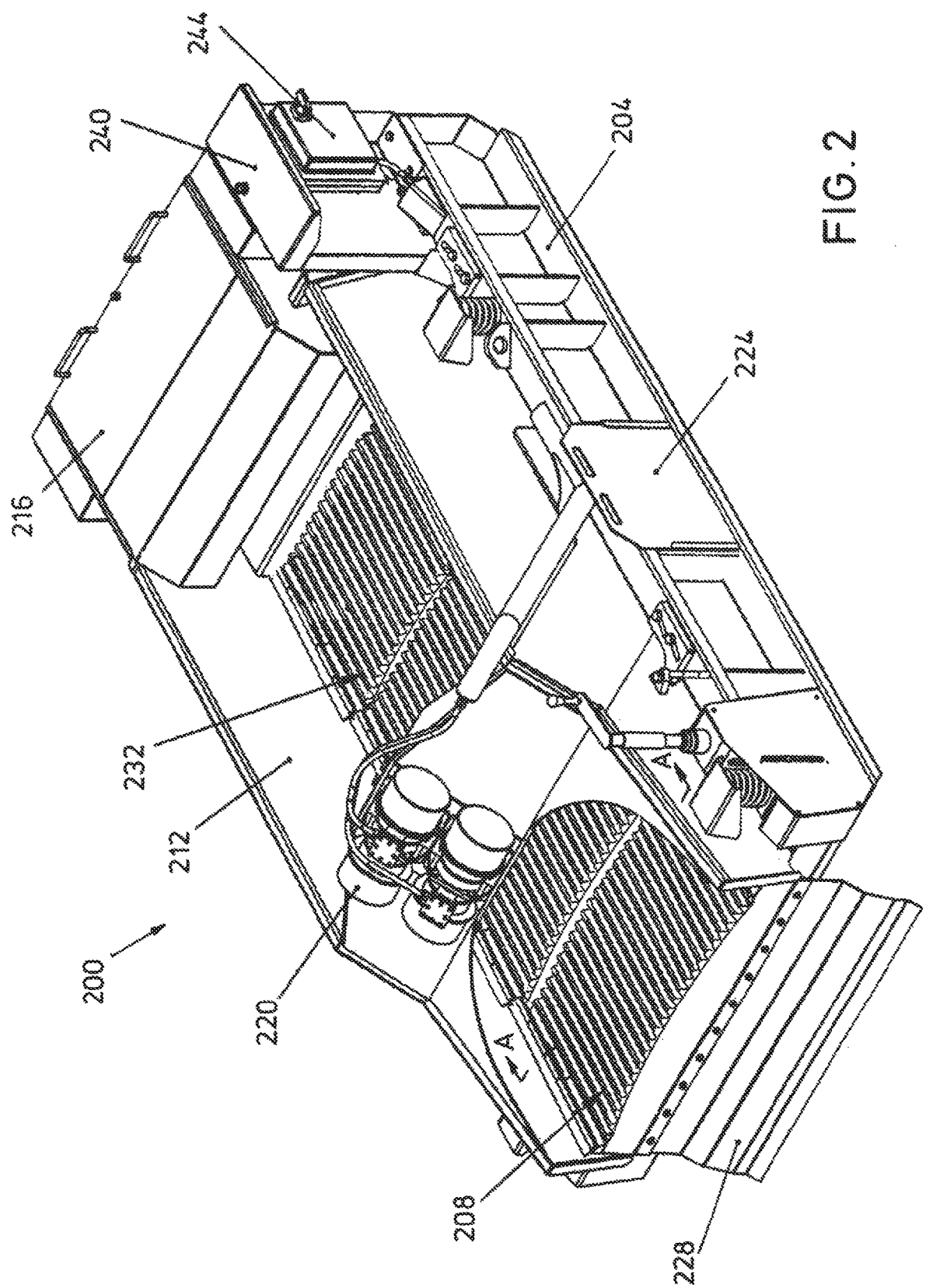
FIG. 2 is a perspective view of a vibratory screening machine mounting a screen panel assembly of the present disclosure.

FIG. 2 is a perspective view of a vibratory screening machine 200 used with the apparatus and method of the present disclosure. The machine 200 comprises a shaker base assembly 204, which provides a base in which a screen panel assembly 208, shaker basket assembly 212 and feed box assembly 216 sit. Drilling fluid mixture is fed into the feed box assembly 216, which goes into the shaker basket assembly 212. The shaker basket assembly 212 contains the screen panel assembly 208, which serves as a filter for the drilling fluid mixture. At least one motion generator or motor 220 provides shaking motion to the shaker basket assembly 212. Solids in the drilling fluid mixture are separated or strained out after the drilling fluid mixture passes through screen assembly 232 of the screen panel assembly 208. The strained drilling fluid is discharged at the discharge port 224. Solids removed from the drilling fluid mixture travel forward on top of the screen assembly 232 and are discharged over the discharge skirt 11.

In one embodiment of the present disclosure, the screen panel assembly 208 is installed and removed by hand. In another embodiment, a vibratory shaker machine includes an automated placement and tensioning system to install, seat, and tension a screen panel assembly in a screen shaker basket assembly. A control panel support stand 240 is mounted to the side of the machine 200. An electrical control panel 244 is attached to the control panel support stand 240.

Figure 3:
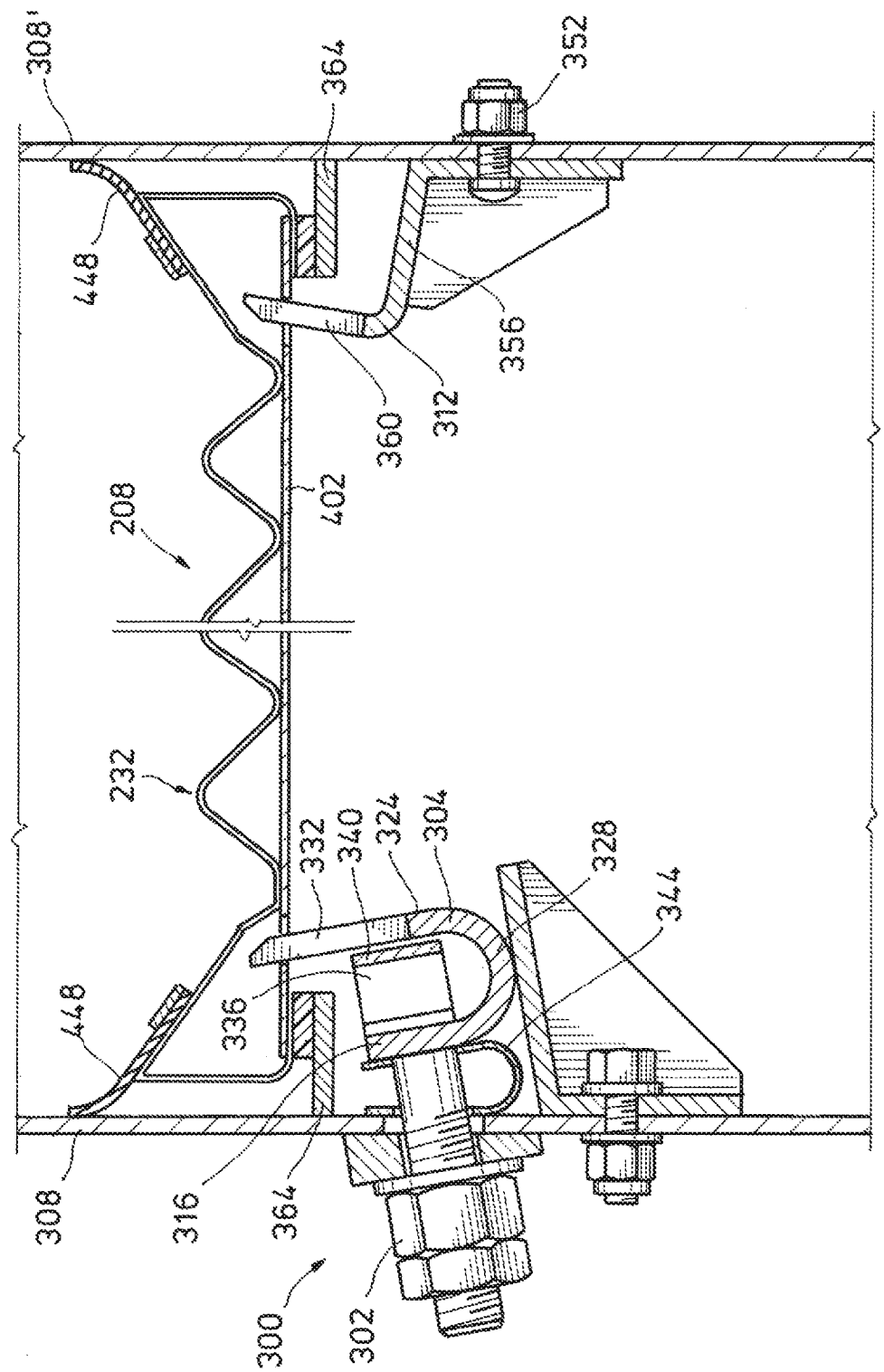
FIG. 3 is a cross-sectional view, taken along line A-A of FIG. 2, showing the tensioning system for the screen panel assembly in a shaker basket assembly of the vibratory screening machine.

FIG. 3 is a cross-sectional view, taken along line A-A of FIG. 2, showing the screen panel assembly 208 and a screen tensioning assembly 300 therefor in the shaker basket assembly 212 of the vibratory screening machine 200. The screen tensioning assembly 300 includes a screen tensioning nut 302 and a movable tensioning member 304 mounted on a sidewall 308 of the shaker basket assembly 212, a stationary tensioning member 312 mounted on the other sidewall 308' of the shaker basket assembly 212, and a tightening nut assembly 316.

The movable tensioning member 304 has an elongated body 30 which is of generally U-shaped configuration having a rear side 320 and a front side 324 connected by base or U-bend 328. A plurality of spaced flexible resilient fingers 332 extend from front side 324. U-bend 328 is also flexible and resilient. A block 336 has one side welded to rear side 320 and the opposite side of block 336 is welded to the central portion of a reinforcing bar 340 which has its opposite ends welded to rear side 31 at 40. The portion of reinforcing bar 340 on block 336 is spaced from front side 324. Reinforcing bar 340 increases rigidity of rear side 320 against excessive flexing. A band spring 344 is riveted to rear side 320 by a plurality of rivets (not shown). Fingers 332 have relatively narrow upper portions which merge into downwardly outwardly flaring portions which merge into front side 324.

An elongated planar base 348 of fixed tensioning member 312 is rigidly mounted on sidewall 308' by a plurality of nut and bolt assemblies 352 which extend through base 348 and sidewall 308'. A central portion 356 extends upwardly and outwardly from base 348, and a plurality of flexible resilient fingers 360, which are identical to fingers 332, extend upwardly from side 360 which extends upwardly from central portion 356. In other embodiments, fingers 360 and fingers 332 are not identical. There are no tensioning nut assemblies on sidewall 308' of the machine 200. Therefore, this side of the machine need not be accessed for changing the screen carrier assemblies 208. Thus, sidewall 308' can be placed closely adjacent a wall or other objects, thereby conserving space. The resilience of the fingers 332 and 360 tend to maintain a substantially constant tension on the screen carrier assemblies 208.

Attached to sidewalls 308 and 308' are respectively, interior shelves 364 and 364', which support screen panel assembly 208. The screen panel assembly 208 is placed by hand, machine or other means into shaker basket assembly 212 such that it rests on shelves 364 and 364'.

When tensioned by the screen tensioning assembly 300, the screen panel assembly 208 has a slight curve so that its center is raised approximately one inch from a horizontal plane including opposite side edges (shown as 406 and 406' in FIG. 5) of the panel. In other embodiments, the center is raised more and less than one inch depending on, for example, the length of the screen panel.

Figure 4:
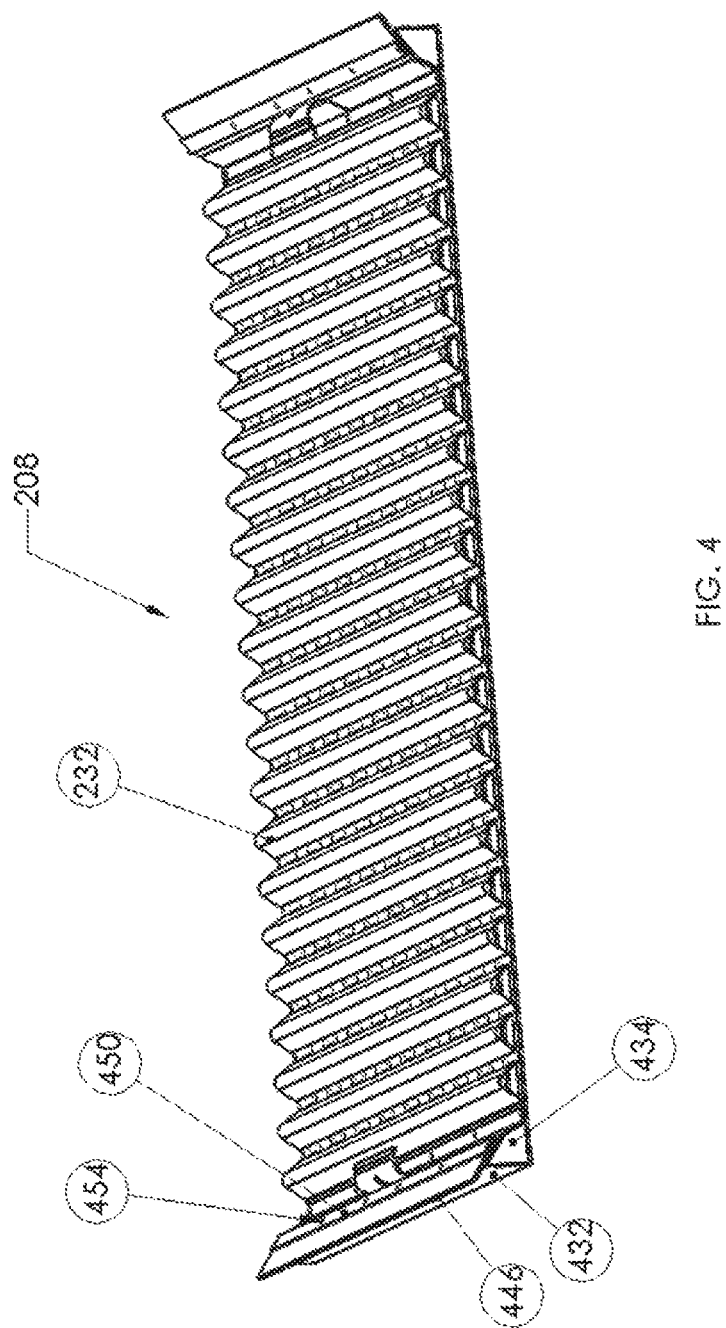
FIG. 4 is a perspective view of the screen panel assembly including a screen assembly.

FIG. 4 is a perspective view of screen panel assembly 208 including screen assembly 232. Screen panel assembly includes a hook assembly 432 which includes caps 434 at opposite ends. Caps 434 provide structural support for the hook assembly 432 and prevent debris from entering it. Screen panel assembly 208 is generally rectangular and symmetrical in each of length and width directions.

Figure 5A:
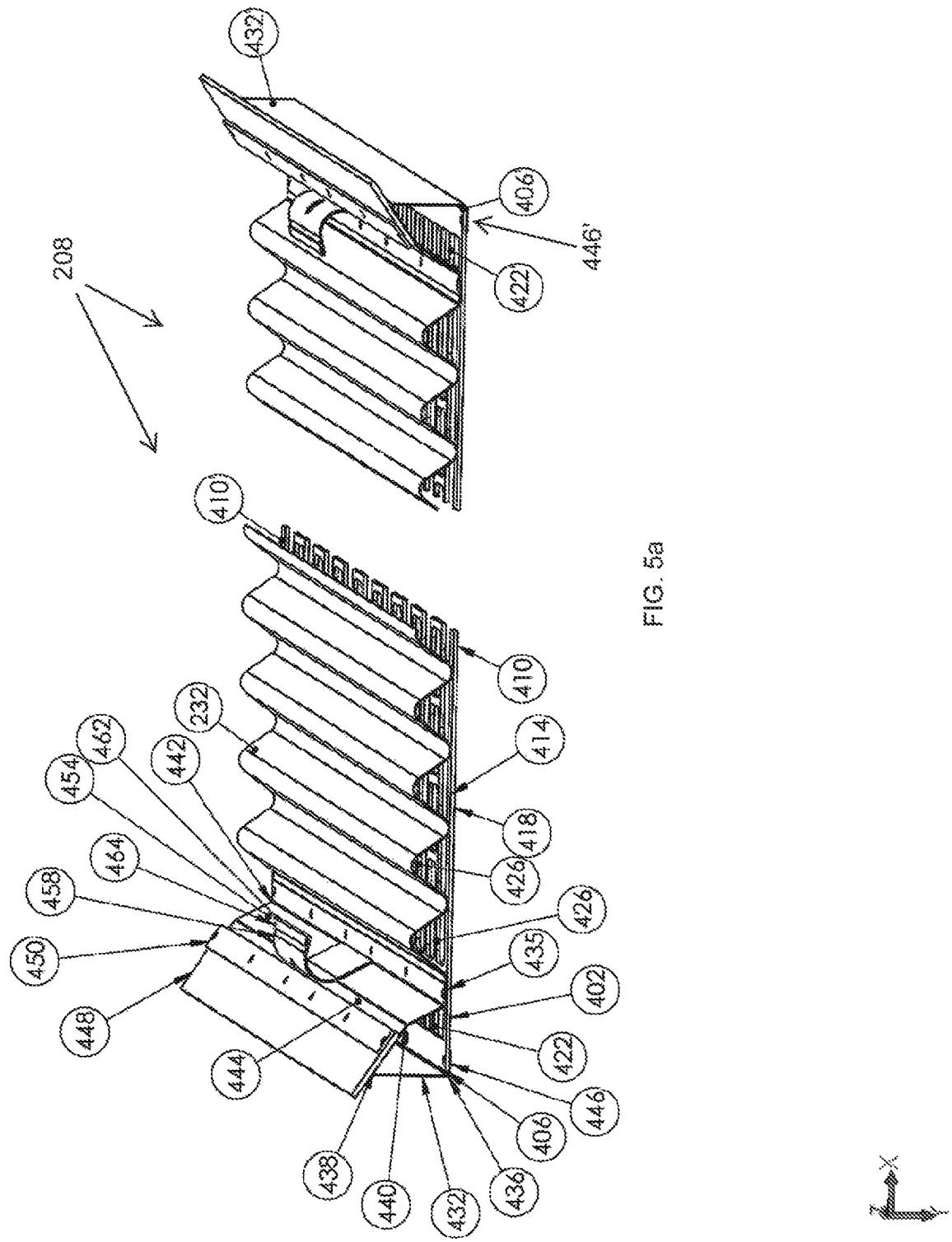
FIG. 5a is a perspective view of the screen panel assembly with caps removed to provide an interior view.
Figure 5B:
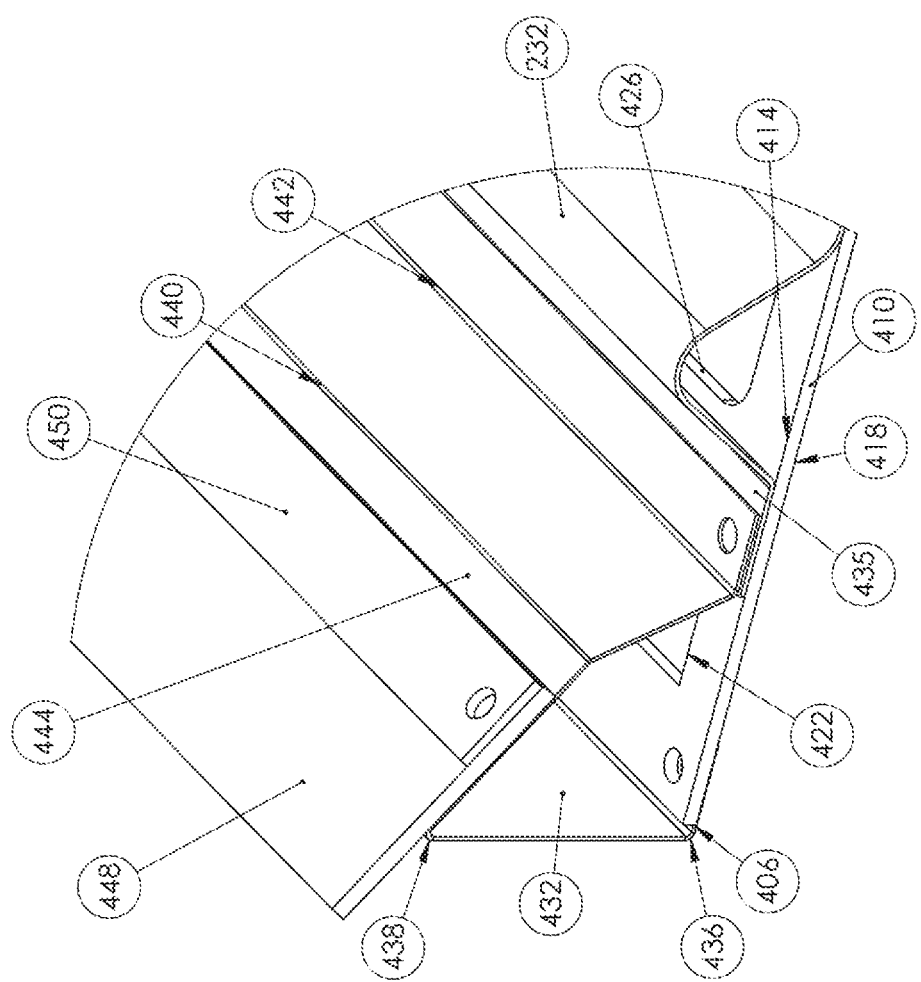
FIG. 5b is an enlarged view of a corner of the screen panel assembly with cap removed.
Figure 6:
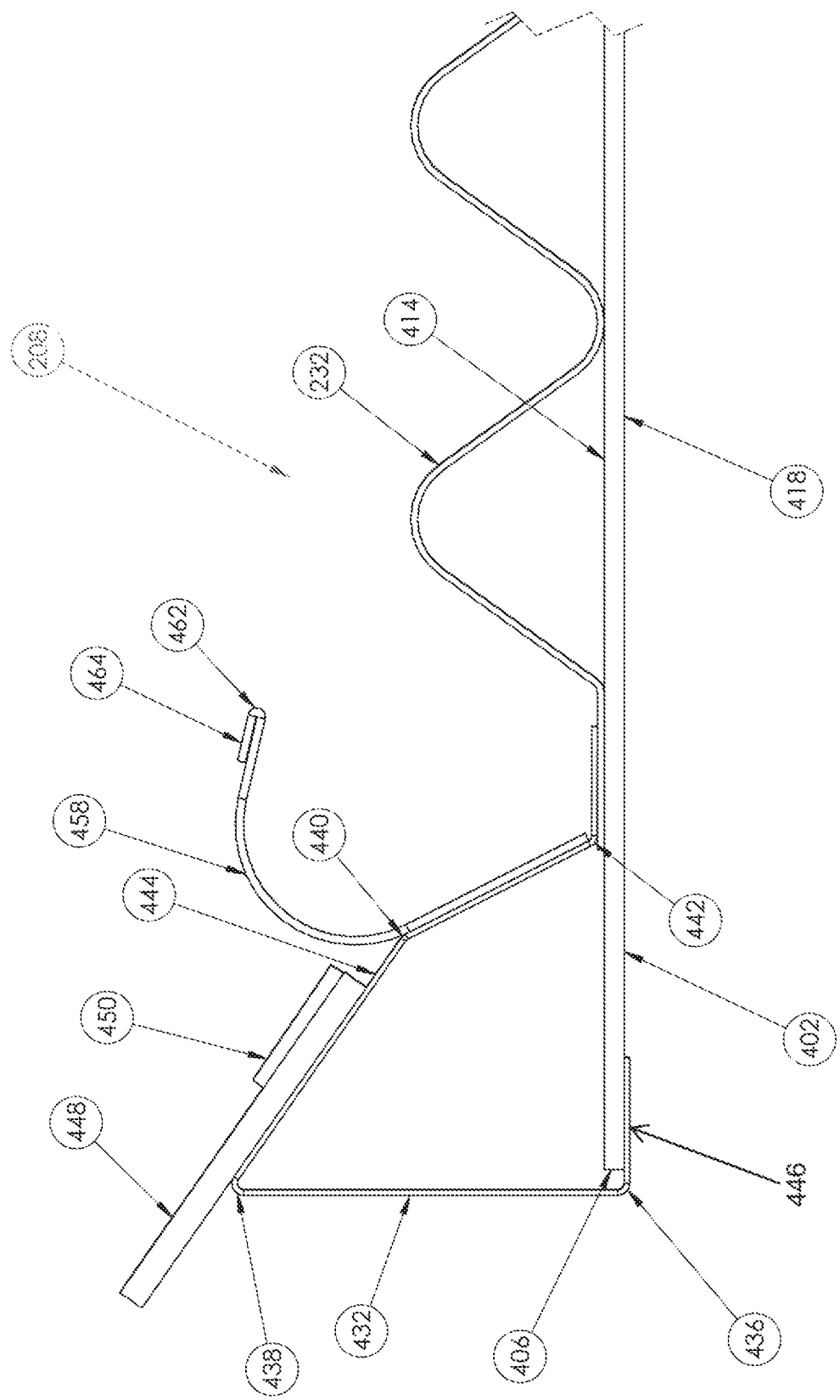
FIG. 6 is a cross-sectional side view of the screen panel assembly.

FIG. 5a is a perspective view of screen panel assembly 208 with caps 434 removed to provide an interior view. FIG. 5b is an enlarged view of a corner of screen panel assembly 208 with cap 434 removed. Perforated plate 402, made of steel or any other suitable material, supports screen assembly 232. The plate 402 has a first pair of opposite side edges 406 and 406' and a second pair of opposite side edges 410 and 410', and an upper surface 414 and a lower surface 418. The length of plate 402 between side edges 406 and 406' is approximately 3½ feet, and its width between edges 410 and 410' is approximately 2½ feet and it has a thickness of 14 gauge. In other embodiments, the size of plate 402 varies as required to fit different machines. In still other embodiments, the thickness of plate 402 varies as required for different slurry compositions and for different plate sizes. Plate 402 includes first apertures 422 and 422' for receiving fingers 332 and 360, and second apertures 426 to allow liquids to pass through screen panel assembly 208.

Hook assemblies 432 and 432' are attached respectively at plate edges 406 and 406' to, among other things, clamp together an end 435 of screen assembly 232 and plate 402. Hook assemblies 432 and 432' are each formed from a continuous, rectangular plate of steel bent four times along its longer dimension to form four bends 436, 438, 440, and 442. Bottom portions 446 and 446' of hook assemblies 432 and 432' are bonded to plate edges 406 and 406' using epoxy resin (not shown) therebetween. In other embodiments bottom portions 446 and 446' are connected to edges 406 and 406' using other adhesives, or by welding. In still other embodiments, bottom portions 446 and 446' and edges 406 and 406' are continuous pieces of metal; in other words, hook assembly 432 and plate 402 are a single piece of metal plate. By clamping together an end 435 of screen assembly 232 and plate 402 using hook assembly 432, delamination of the screen assembly 323 is prevented.

Attached to an upper face 444 of hook assembly 432 between bends 438 and 440 is a gasket 448 made of rubber. In other embodiments gasket 448 is made of flexible resin or other polymeric material. On insertion of screen panel assembly 208 into shaker basket assembly 212, gasket 448 bends to meet the sidewalls 308 and 308' of the shaker basket assembly 212, thereby forming a seal therebetween. The seal prevents debris in the slurry from passing around the screen panel assembly 208 and defeating the purpose of the screen assembly 232.

Gasket 448 is affixed to the upper face 444 of hook assembly 432 by sandwiching between a gasket bar 450 riveted using rivets 454 to the upper face 444. Other embodiments use bolts or screws instead of rivets. Other embodiments use an adhesive in addition to the rivets 454. Further embodiments do not use a gasket bar 450. Instead, gasket 448 is riveted to the upper face 444, with or without washers between the rivet heads and the gasket depending on gasket strength and/or rivet head dimension. In sill other embodiments, the gasket is affixed to the upper face 444 using an adhesive alone.

Attached to inward side face 454 between bends 440 and 442 of hook assembly 432 is handle 458. Handle 458 is attached by welding. In other embodiments, handle 458 is attached using rivets, screws, bolts, adhesive or other attachment devices or methods. Handle 458 provides a convenient point for a human or mechanical operator to grip and move screen panel assembly 208 into and out of shaker basket assembly 212. Handle 458 is made of curved galvanized metal plate. Handle end 562 bends back on itself to provide a thicker grip 462 and to avoid exposing any sharp edge to an operator. In other embodiments, the handle 562 is made of other and the thicker grip 462 is provided using rubber, resin or other polymeric material. Handle end 462 is selected or painted a distinguishing color, such as red, to be easily spotted by an operator in order to aid in quick removal of the screen panel assembly 208 from the shaker basket assembly 212.

Figure 7:
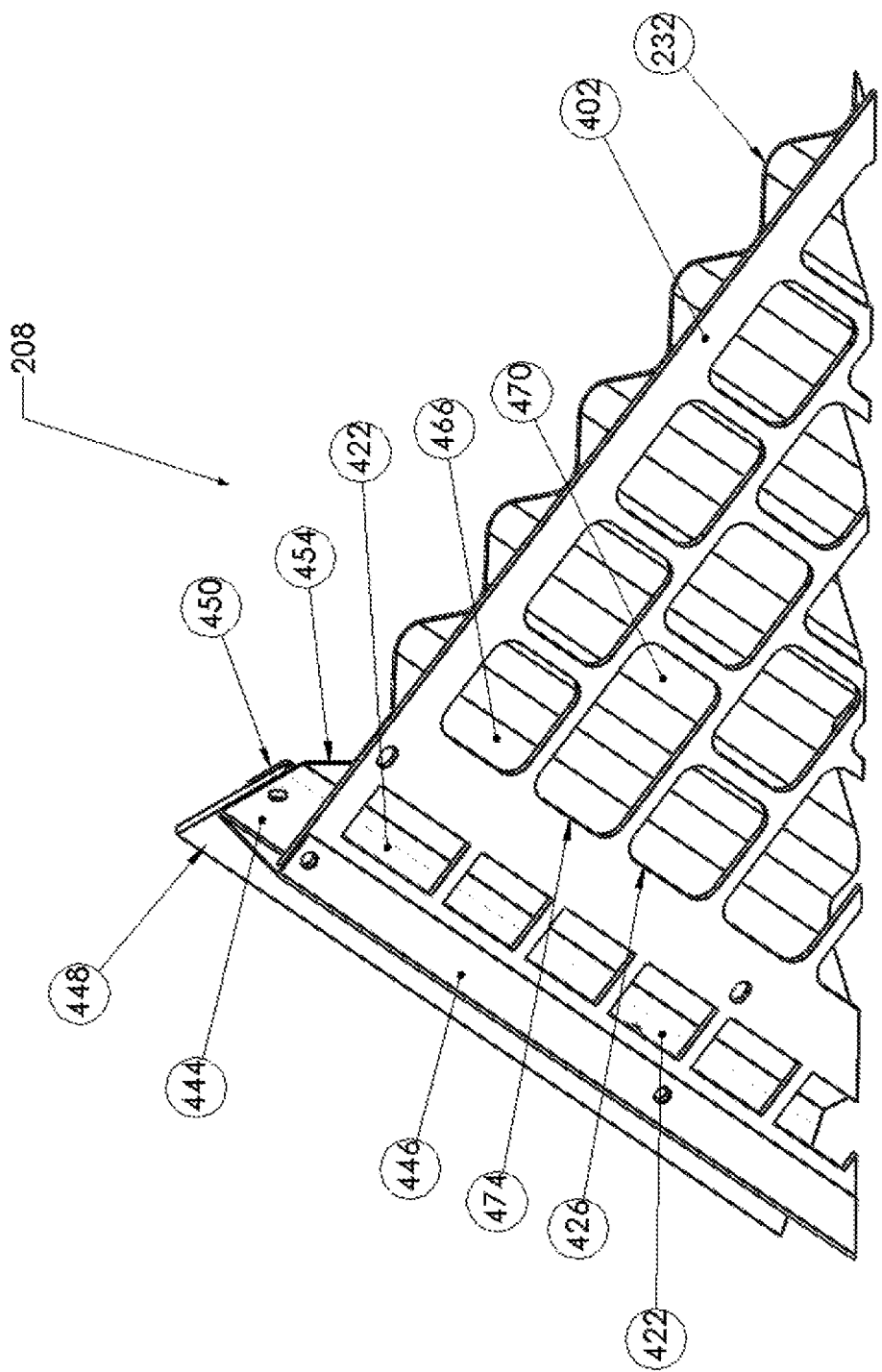
FIG. 7 is a bottom perspective partial view of the screen panel assembly.

FIG. 7 is a bottom perspective partial view of screen panel assembly 208. First apertures 422 in plate 402 are rectangular with widths matched to the widths of fingers 33. First apertures 422 are dimensioned to removably receive fingers 332 while providing some play in the 406-406' direction of the plate 402 and less play in the 410-410' direction of plate 402. Second apertures 426 include short apertures 466 and long apertures 470 to form an aperture pattern in which adjacent rows 474 have staggered second apertures 426 for structural strength of plate 402.

Figure 8:
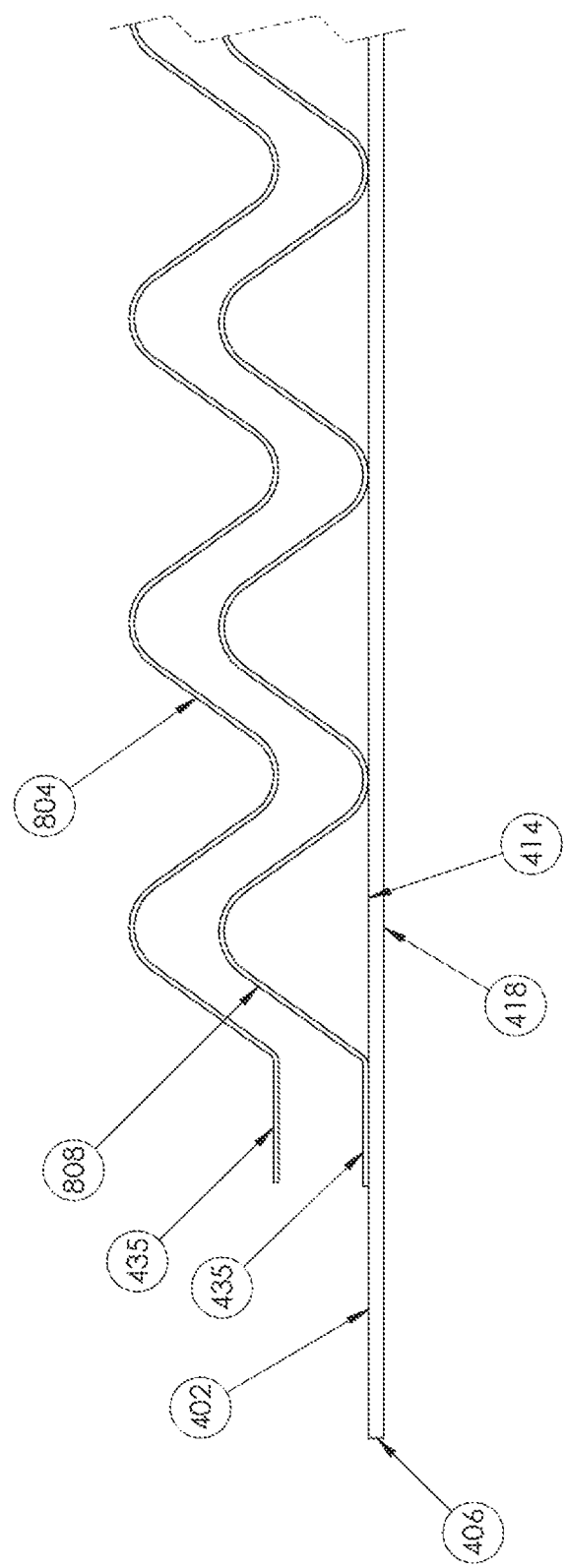
FIG. 8 is a cross-sectional exploded view of the screen assembly and a plate used in the screen panel assembly.

FIG. 8 is a cross-sectional exploded view of the screen assembly 232 and plate 402 used in the screen panel assembly 208. The screen assembly 232 includes corrugated exterior mesh 804 made of polymeric material and corrugated interior screen mesh or cloth 808 made of metal. Interior cloth 808 is a laminate formed of three raw pieces of mesh cloth of differing gauges. Exterior mesh 804 and interior cloth 808 are heat pressed together to form the screen assembly 232. In other embodiments, mesh 804 or cloth 808 or both are other numbers of meshes or cloths, and made from metal or plastic or resin polymer or combinations thereof. In other embodiments mesh 804 and cloth 808 are bonded together using an adhesive. Troughs 816 of the corrugated combined mesh 804 and cloth 808 are bonded to plate 402 using a heat-and-bond adhesive. In other embodiments, other types of adhesives are used. End 435 of screen assembly 232 is cut to have an even, clean edge and formed to lay flat against the plate 402. End 435 is bonded to plate 408 using an adhesive. In other embodiments, other configurations for securing the end 435 to plate 402 are used.

Corrugation of the screen assembly 232 increases the screening area and thus increases throughput of the slurry. Further, the corrugation provides additional flow paths for material to be screened. In other embodiments, the screen assembly 232 is in a planar or other configuration depending on the volume and composition of slurry to be processed, and the acceptable frequency of rotation of the screen assemblies 232.

With reference to FIG. 3, each screen assembly 208 is mounted in the following manner. Screen assembly 208 is placed with plate edge 406' over fingers 360 and against interior shelf 364'. Thereafter, plate edge 406 is allowed to drop over fingers 332 and onto interior shelf 364. Then, tensioning nut 302 is rotated clockwise to cause fingers 332 to move toward sidewall 308, firstly causing first apertures 422 and fingers 332 to engage, and secondly causing fingers 332 to applying tension to plate 402 resulting in it being firmly held in place. Other methods for mounting the screen assembly 208 may be used. In other embodiments, other tensioning devices are used.

Thus, a screen panel assembly for mounting in a vibratory screening machine and methods for manufacture and use thereof have been described. Embodiments of the screen panel assembly may include: a plate including: first apertures at opposite first and second ends of the plate, the first apertures for receiving fingers for positioning the plate; and second apertures for passing liquids therethrough; a corrugated screen assembly supported by the plate, the corrugated screen assembly for screening any solids from the liquids, the corrugated screen assembly including opposite first and second ends lying flat against the plate; a first hook assembly having a first end connected to the first end of the plate, a middle portion spaced above the first apertures at the first end of the plate, and a second end parallel to the plate, the second end of the first hook assembly and the first end of the plate sandwiching the first end of the corrugated screen assembly; a second hook assembly having a first end connected to the second end of the plate, a middle portion spaced above the first apertures at the second end of the plate, and a second end parallel to the plate, the second end of the second hook assembly and the second end of the plate sandwiching the second end of the corrugated screen assembly; and first and second gaskets each having opposite first and second ends, the first end of the first and second gaskets connected to, respectively, the middle portion of the first and second hook assemblies, the second ends of the first and second gaskets for sealing out at least solids.

For any one of the foregoing embodiments, the screen panel assembly may include any one of the following elements, alone or in combination with each other: first and second handles connected to, respectively, the middle portion of the first and second hook assemblies; the second apertures of the plate are staggered; first and second gasket bars, the first and second gasket bars and the middle portion of the first and second hook assemblies sandwiching, respectively, the first end of the first and second gaskets; the first and second gaskets are flexible and include a polymer; each of the plate and the first and second hook assemblies include metal; the corrugated screen assembly comprises a plurality of metal meshes of at least two different gauges and a polymeric mesh bonded together; and the plate and the first hook assembly are formed of a single continuous piece of metal.

A method for manufacturing a screen panel assembly for a vibratory screening machine has been described. Embodiments of the method may include: providing a plate including: first apertures at opposite first and second ends of the plate, the first apertures for receiving fingers for positioning the plate; and second apertures for passing liquids therethrough; providing a corrugated screen; bonding the corrugated screen on the plate, the corrugated screen assembly for screening any solids from the liquids, the corrugated screen assembly including opposite first and second ends lying flat against the plate; connecting a first end of a first hook assembly to the first end of the plate; spacing a middle portion of the first hook assembly above the first apertures at the first end of the plate; sandwiching the first end of the corrugated screen assembly between a second end of the first hook assembly and the first end of the plate; sandwiching the second end of the corrugated screen assembly between a second end of the second hook assembly and the second end of the plate; and connecting first ends of first and second gaskets to, respectively, the middle portion of the first and second hook assemblies.

For the foregoing embodiments, the method may include any one of the following steps or elements, alone or in combination with each other: providing first and second handles; connecting the first and second handles to, respectively, the middle portion of the first and second hook assemblies; the second apertures of the plate are staggered; providing gasket bars; sandwiching the first ends of first and second gaskets between, respectively, first and second gasket bars and the middle portion of the first and second hook assemblies sandwiching; the first and second gaskets are flexible and include a polymer; each of the plate and the first and second hook assemblies include metal; the step of providing the corrugated screen assembly includes bonding a plurality of metal meshes of at least two different gauges and a polymeric mesh together; and the step of connecting a first end of a first hook assembly to the first end of the plate includes providing the plate and the first hook assembly formed of a single continuous piece of metal.

Thus, a vibratory screening machine has been described. Embodiments of the machine may include: a feed box assembly; a shaker box assembly having opposite first and second sidewalls; at least one motion generator operatively connected to the shaker basket assembly; and a removable screen panel assembly. Embodiments of the screen panel assembly may include: a plate including: first apertures at opposite first and second ends of the plate, the first apertures for receiving fingers for positioning the plate within the shaker basket assembly; and second apertures for passing liquids therethrough; a corrugated screen assembly supported by the plate, the corrugated screen assembly for screening any solids from the liquids, the corrugated screen assembly including opposite first and second ends lying flat against the plate; a first hook assembly having a first end connected to the first end of the plate, a middle portion spaced above the first apertures at the first end of the plate, and a second end parallel to the plate, the second end of the first hook assembly and the first end of the plate sandwiching the first end of the corrugated screen assembly; a second hook assembly having a first end connected to the second end of the plate, a middle portion spaced above the first apertures at the second end of the plate, and a second end parallel to the plate, the second end of the second hook assembly and the second end of the plate sandwiching the second end of the corrugated screen assembly; and first and second gaskets each having opposite first and second ends, the first end of the first and second gaskets connected to, respectively, the middle portion of the first and second hook assemblies, the second ends of the first and second gaskets in contact with, respectively, the first and second side walls of the shaker basket assembly.

For any one of the foregoing embodiments, the vibratory screening machine may include any one of the following elements, alone or in combination with each other: first and second handles connected to, respectively, the middle portion of the first and second hook assemblies; the second apertures of the plate are staggered; and first and second gasket bars, the first and second gasket bars and the middle portion of the first and second hook assemblies sandwiching, respectively, the first end of the first and second gaskets.

The Abstract of the disclosure is solely for providing a way by which to determine quickly from a cursory reading the nature and gist of technical disclosure, and it represents solely one or more embodiments.

The embodiments set forth herein are merely illustrative and do not limit the scope of the disclosure or the details therein. It will be appreciated that many other modifications and improvements to the disclosure herein may be made without departing from the scope of the disclosure or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed:

1. A screen panel assembly for a vibratory screening machine for separating liquids and solids, the screen panel assembly comprising:
    a plate including: first apertures at opposite first and second ends of the plate, the first apertures for receiving fingers for positioning the plate; and second apertures for passing liquids therethrough;
    a corrugated screen assembly supported by the plate, the corrugated screen assembly for screening any solids from the liquids, the corrugated screen assembly including opposite first and second ends lying flat against the plate;
    a first hook assembly having a first end connected to the first end of the plate, a middle portion spaced above the first apertures at the first end of the plate, and a second end parallel to the plate, the second end of the first hook assembly and the first end of the plate sandwiching the first end of the corrugated screen assembly;
    a second hook assembly having a first end connected to the second end of the plate, a middle portion spaced above the first apertures at the second end of the plate, and a second end parallel to the plate, the second end of the second hook assembly and the second end of the plate sandwiching the second end of the corrugated screen assembly; and
    first and second gaskets each having opposite first and second ends, the first end of the first and second gaskets connected to, respectively, the middle portion of the first and second hook assemblies, the second ends of the first and second gaskets for sealing out at least solids.

2. The screen panel assembly of claim 1 further comprising:
    first and second handles connected to, respectively, the middle portion of the first and second hook assemblies.

3. The screen panel assembly of claim 1 wherein:
    the second apertures of the plate are staggered.

4. The screen panel assembly of claim 1 further comprising:
    first and second gasket bars, the first and second gasket bars and the middle portion of the first and second hook assemblies sandwiching, respectively, the first end of the first and second gaskets.

5. The screen panel assembly of claim 1 wherein:
    the first and second gaskets are flexible and include a polymer.

6. The screen panel assembly of claim 1 wherein:
    each of the plate and the first and second hook assemblies include metal.

7. The screen panel assembly of claim 1 wherein:
    the corrugated screen assembly comprises a plurality of metal meshes of at least two different gauges and a polymeric mesh bonded together.

8. The screen panel assembly of claim 1 wherein:
    the plate and the first hook assembly are formed of a single continuous piece of metal.

9. A method for manufacturing a screen panel assembly for a vibratory screening machine, the method comprising:
    providing a plate including: first apertures at opposite first and second ends of the plate, the first apertures for receiving fingers for positioning the plate; and second apertures for passing liquids therethrough;
    providing a corrugated screen;
    bonding the corrugated screen on the plate, the corrugated screen assembly for screening any solids from the liquids, the corrugated screen assembly including opposite first and second ends lying flat against the plate;
    connecting a first end of a first hook assembly to the first end of the plate;
    spacing a middle portion of the first hook assembly above the first apertures at the first end of the plate;
    sandwiching the first end of the corrugated screen assembly between a second end of the first hook assembly and the first end of the plate;
    sandwiching the second end of the corrugated screen assembly between a second end of the second hook assembly and the second end of the plate; and
    connecting first ends of first and second gaskets to, respectively, the middle portion of the first and second hook assemblies.

10. The method of claim 9 further comprising:
    providing first and second handles; and
    connecting the first and second handles to, respectively, the middle portion of the first and second hook assemblies.

11. The method of claim 9 wherein:
    the second apertures of the plate are staggered.

12. The method of claim 9 further comprising:
    providing gasket bars; and
    sandwiching the first ends of first and second gaskets between, respectively, first and second gasket bars and the middle portion of the first and second hook assemblies sandwiching.

13. The method of claim 9 wherein:
    the first and second gaskets are flexible and include a polymer.

14. The method of claim 9 wherein:
    each of the plate and the first and second hook assemblies include metal.

15. The method of claim 9 wherein:
    the step of providing the corrugated screen assembly includes bonding a plurality of metal meshes of at least two different gauges and a polymeric mesh together.

16. The method of claim 9 wherein:
    the step of connecting a first end of a first hook assembly to the first end of the plate includes providing the plate and the first hook assembly formed of a single continuous piece of metal.

17. A vibratory screening machine comprising:
    a feed box assembly;
    a shaker box assembly having opposite first and second sidewalls;
    at least one motion generator operatively connected to the shaker basket assembly; and
    a removable screen panel assembly comprising:
        a plate including: first apertures at opposite first and second ends of the plate, the first apertures for receiving fingers for positioning the plate within the shaker basket assembly; and second apertures for passing liquids therethrough;
        a corrugated screen assembly supported by the plate, the corrugated screen assembly for screening any solids from the liquids, the corrugated screen assembly including opposite first and second ends lying flat against the plate;
        a first hook assembly having a first end connected to the first end of the plate, a middle portion spaced above the first apertures at the first end of the plate, and a second end parallel to the plate, the second end of the first hook assembly and the first end of the plate sandwiching the first end of the corrugated screen assembly;

a second hook assembly having a first end connected to the second end of the plate, a middle portion spaced above the first apertures at the second end of the plate, and a second end parallel to the plate, the second end of the second hook assembly and the second end of the plate sandwiching the second end of the corrugated screen assembly; and first and second gaskets each having opposite first and second ends, the first end of the first and second gaskets connected to, respectively, the middle portion of the first and second hook assemblies, the second ends of the first and second gaskets in contact with, respectively, the first and second side walls of the shaker basket assembly.

18. The machine of claim 17 further comprising:
first and second handles connected to, respectively, the middle portion of the first and second hook assemblies.

19. The machine of claim 17 wherein:
the second apertures of the plate are staggered.

20. The machine of claim 17 further comprising:
first and second gasket bars, the first and second gasket bars and the middle portion of the first and second hook assemblies sandwiching, respectively, the first end of the first and second gaskets.

* * * * *